United States Patent [19]

Swanson et al.

[11] 4,344,385

[45] Aug. 17, 1982

[54] MILKER

[75] Inventors: Harold V. Swanson, Downers Grove; Duncan M. Thompson, Warrenville, both of Ill.

[73] Assignee: Babson Bros. Co., Oak Brook, Ill.

[21] Appl. No.: 66,866

[22] Filed: Aug. 15, 1979

Related U.S. Application Data

[63] Continuation-in-part of Ser. No. 902,331, May 3, 1978, abandoned.

[51] Int. Cl.³ .............................. A01J 5/04; A01J 7/00
[52] U.S. Cl. .............................. 119/14.08; 119/14.14; 119/14.36; 119/14.54
[58] Field of Search ............... 119/14.01, 14.02, 14.08, 119/14.41, 14.50, 14.51, 14.54, 14.46, 14.14, 14.15, 14.17, 14.36, 14.38, 14.43, 14.55

[56] References Cited

U.S. PATENT DOCUMENTS

| | | | |
|---|---|---|---|
| 1,358,987 | 11/1920 | Prince | 119/14.51 |
| 3,092,074 | 6/1963 | Johnson | 119/14.08 |
| 3,094,099 | 6/1963 | Bertao | 119/14.54 |
| 3,115,116 | 12/1963 | Schilling et al. | 119/14.08 |

FOREIGN PATENT DOCUMENTS

| | | | |
|---|---|---|---|
| 116467 | 2/1943 | Australia | 119/14.54 |
| 920819 | 12/1954 | Fed. Rep. of Germany | 119/14.55 |

*Primary Examiner*—Hugh R. Chamblee
*Attorney, Agent, or Firm*—Wegner, McCord, Wood & Dalton

[57] ABSTRACT

An independent quarter milker has four teat cups with individual conduits connected from the teat cups to a manifold mounted on the stall structure. Milk from the manifold flows through a pipeline to a collection tank. A flow sensor and shutoff valve in each milk conduit adjacent the manifold provides individual quarter milking control remote from the teat cups. One or more of the milk conduits may be connected with a milk collection chamber so that the milk from a single quarter may be separately collected, as when one quarter of the cow is infected.

11 Claims, 17 Drawing Figures

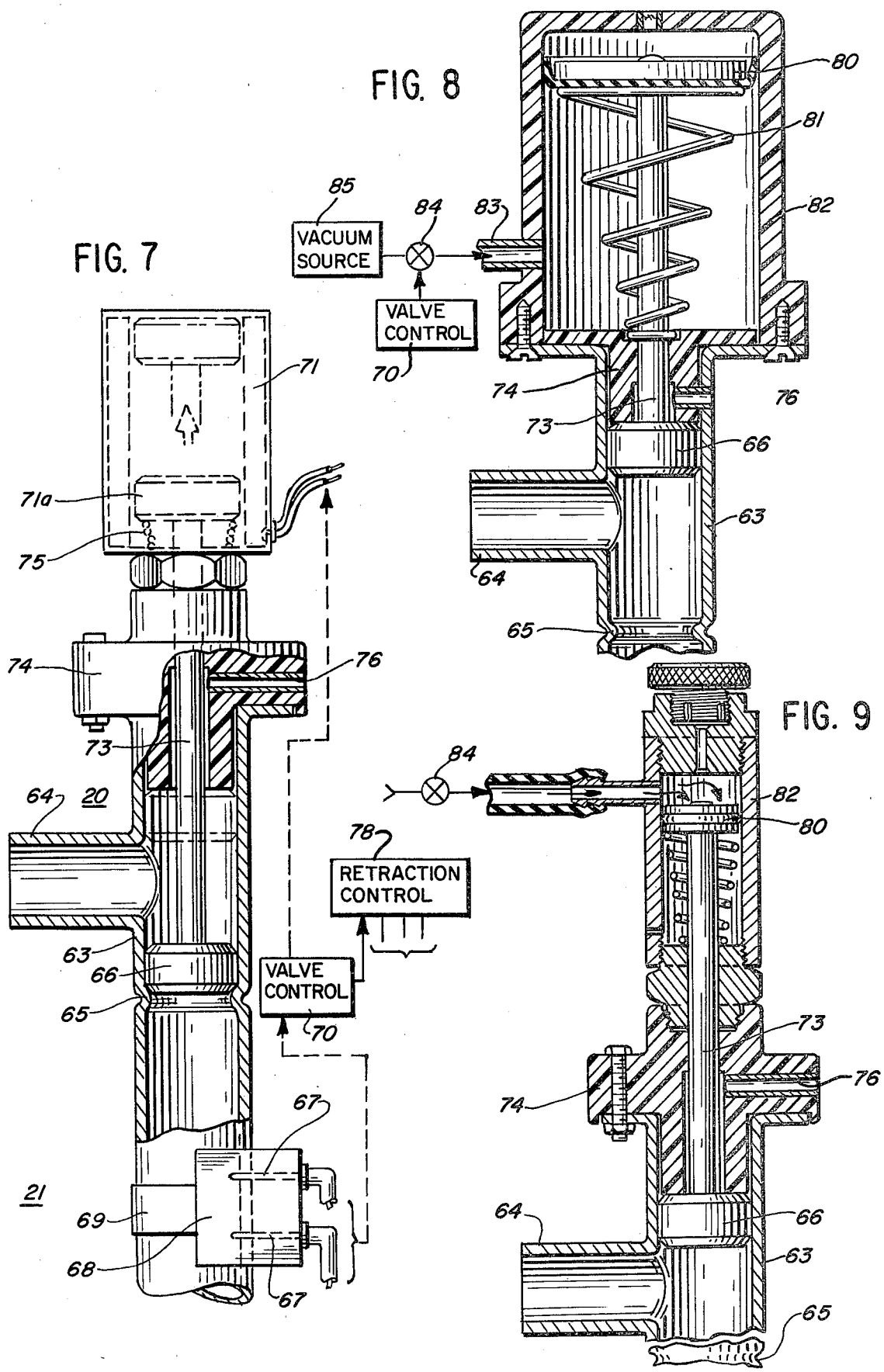

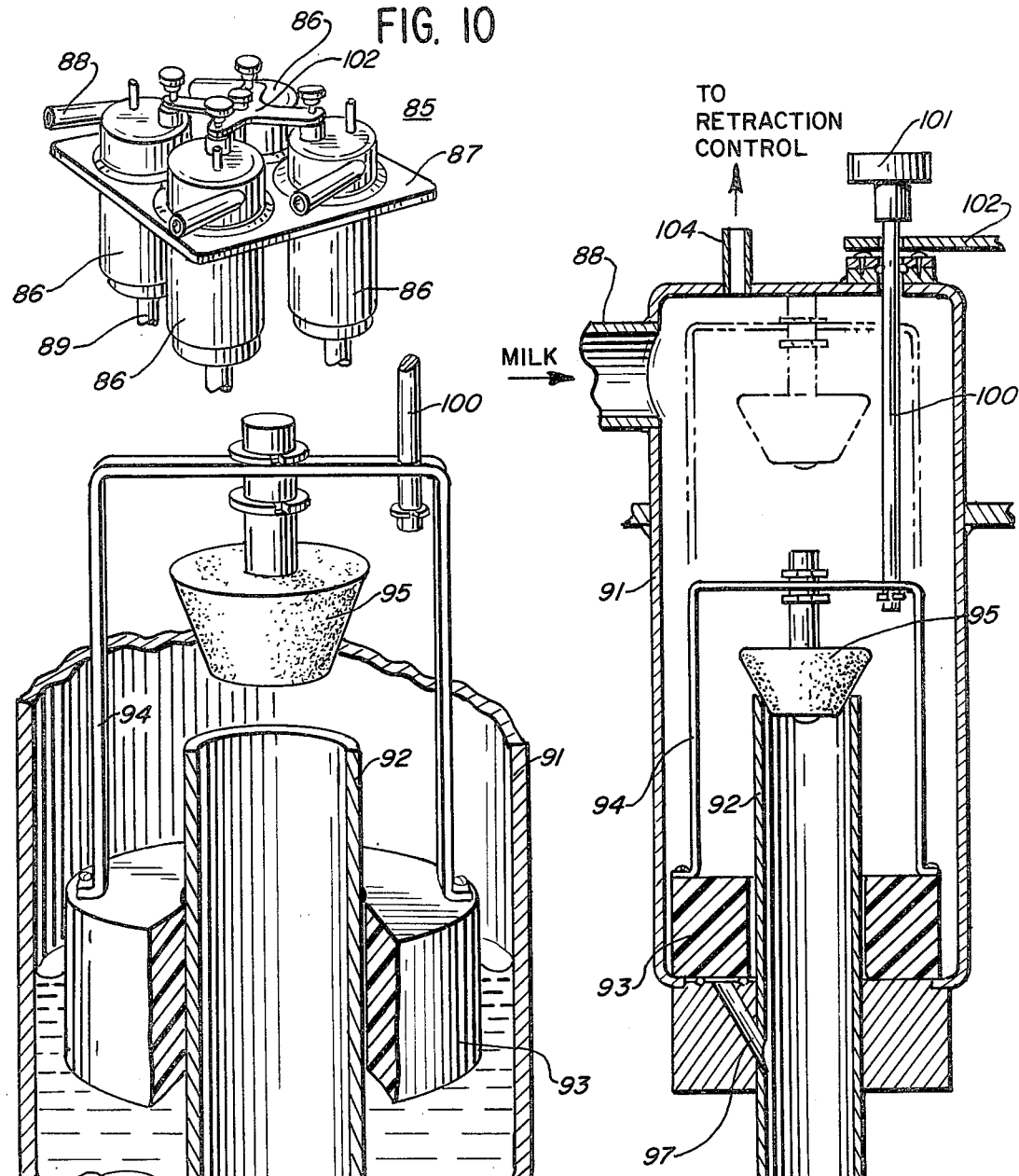
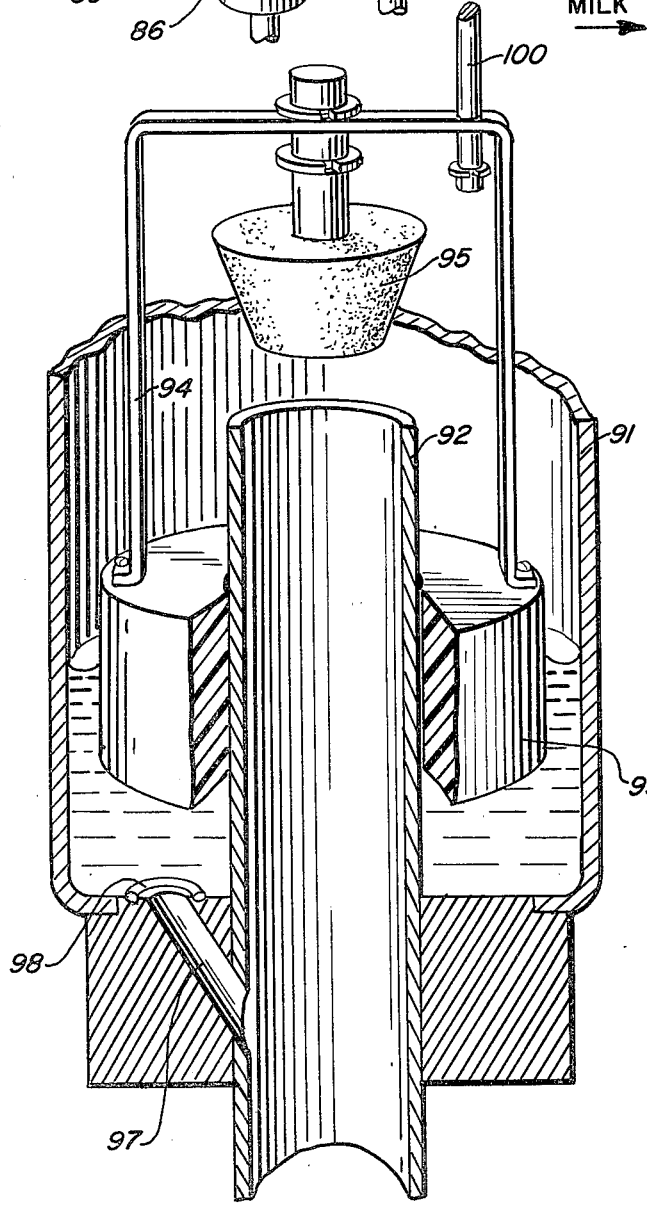
FIG. 10
FIG. 11
FIG. 12

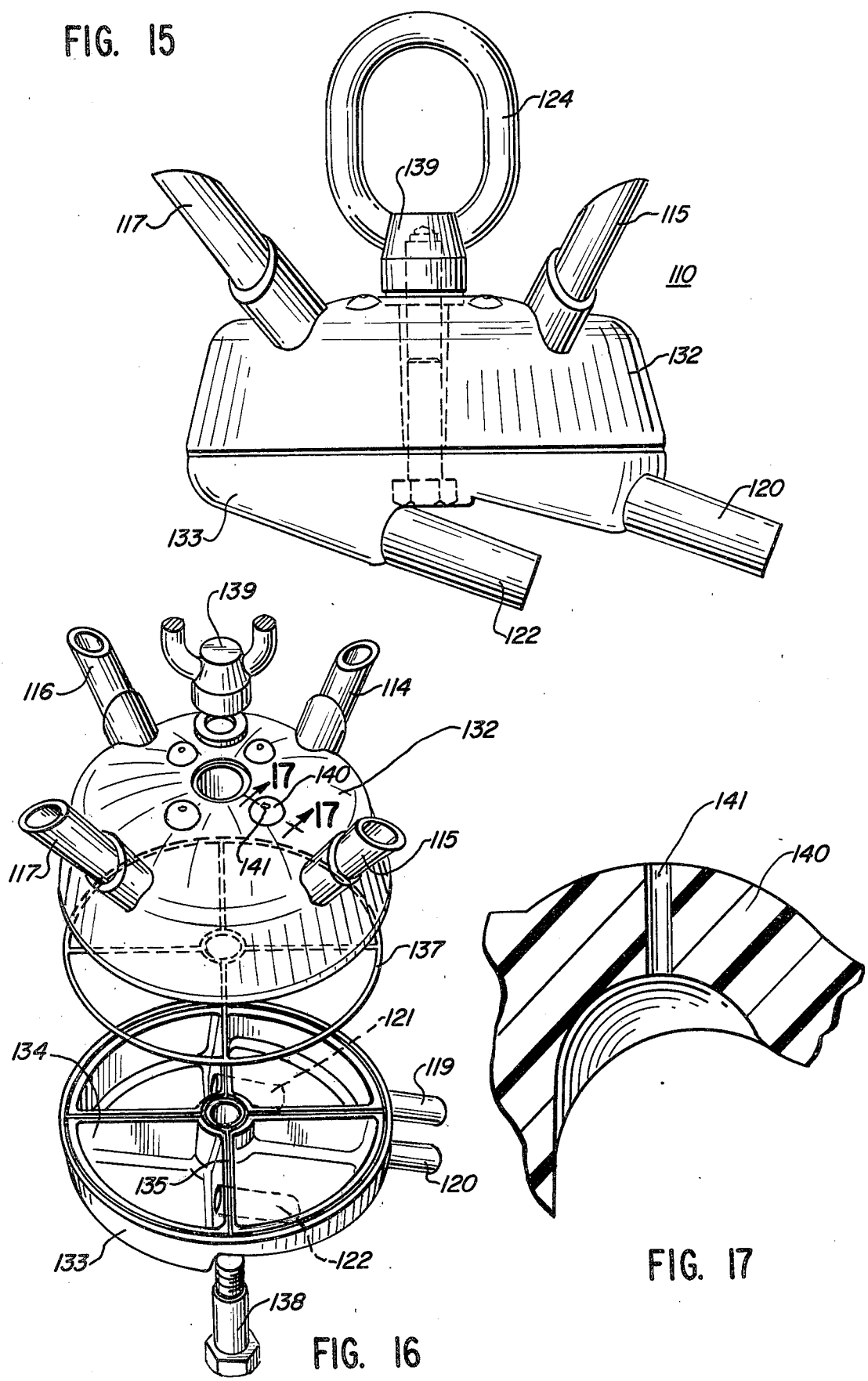

MILKER

This application is a continuation-in-part of copending application Ser. No. 902,331, filed May 3, 1978, now abandoned, and assigned to the assignee of this invention.

This invention relates to a milking apparatus with independent milk conduits connecting each teat cup with a carry-away milk pipeline or the like.

SUMMARY OF THE PRIOR ART

A typical milker has a receiver or claw to which the teat cups are connected. A hose connects the claw with a pipeline through which the milk is directed to a holding tank. The milk from the four quarters mixes in the claw and if one is infected, all of the milk from that cow must be collected and discarded. Moreover, in many such milkers, milk from one quarter may be drawn back into the teat cups of the other quarters. When one quarter is infected, there is a danger of cross infection of the other quarters.

In a milker having selective quarter shutoff valves, milk flow sensors and valve actuators must be incorporated in the receiver adjacent the teat cups. The flow sensing and shutoff mechanisms are subject to damage as by being kicked by the cow and exposed to water, urine and high humidity. The physical abuse and adverse operating conditions present maintenance problems which are particularly serious with a takeoff milker having electrical milk flow sensing, as electrical connections are required to the milking apparatus, adjacent the cow's udder. If the circuits are not well designed, constructed and maintained, they will not function reliably.

In accordance with one aspect of the invention, the milker comprises four double action teat cups and four separate milk conduits connected between the teat cups and a milk delivery point or manifold.

Another feature of the invention is that the manifold is spaced from the cow and teat cups and is preferably mounted on the stall structure.

A further feature is that a quarter shutoff valve and a flow sensor are provided in each milk conduit, remote from the teat cups and cow, to control the milking of each quarter but without subjecting the flow sensors and shutoff valves to the severe environment of the teat cups and milk receiver.

Further features and advantages of the invention will readily be apparent from the following specification and from the drawings, in which:

FIG. 7 is an enlarged fragmentary section through a quarter shutoff valve with electric flow sensing and an electric valve operator;

FIG. 8 is a fragmentary section of a quarter control valve with vacuum operation;

FIG. 9 is a fragmentary section of a quarter control valve with air operation;

FIG. 10 is a perspective of a quarter shutoff, float valve assembly;

FIG. 11 is an enlarged broken perspective of a quarter shutoff float valve in raised position;

FIG. 12 is a vertical section of the quarter shutoff float valve in closed position;

FIG. 15 is a side elevation of the milk receiver of FIG. 13;

FIG. 16 is an exploded illustration of the milk receiver of FIG. 13; and

FIG. 17 is a fragmentary enlarged section taken along line 17—17 of FIG. 16.

The milking system disclosed herein is particularly suited for use in a parlor milking installation where successive cows come to and are held in a stall during milking. This is to be contrasted with a stanchion installation where the cows are secured in stanchions and the milking apparatus is moved from cow to cow by an operator.

Figure 1:
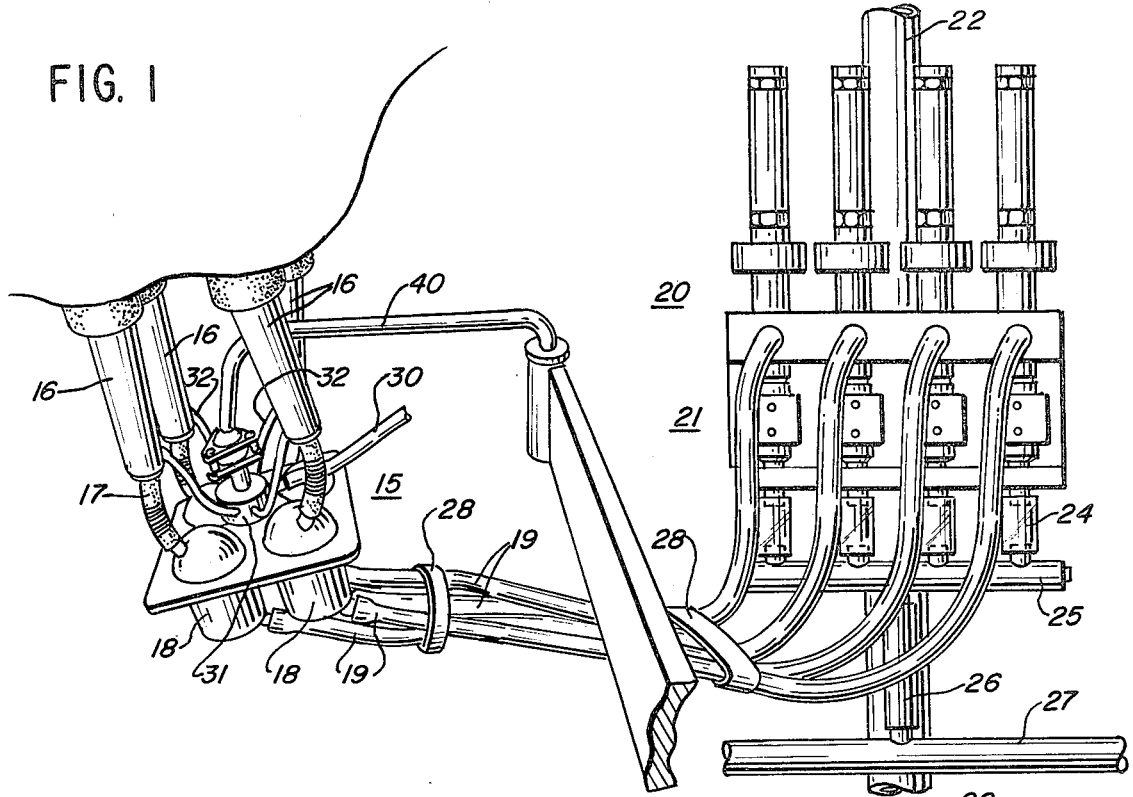
FIG. 1 is a diagrammatic illustration of a form of the invention.

Milker unit 10, FIG. 1, has four teat cups 16 each of which includes a rigid shell with a flexible liner or inflation having a stem portion 17. Each of the inflation stems is connected with an intermediate receiver or chamber 18, described in more detail below. Separate milk conduits 19 connect each of the chambers with an assembly of shutoff valves 20 and milk flow sensors 21 mounted on a member 22 of the stall. Short connectors 24 direct the milk from flow sensors 21 to a manifold 25. Connector 26 directs the milk from the manifold to a tank, not shown. Manifold 25 provides a convenient connection point for the tubes 24 so that only one connector nipple is required on pipeline 27. Functionally the manifold may be considered a part of the pipeline. The milk from the four quarters does not mix until it reaches manifold 25. The milk from one quarter cannot be drawn back into another teat cup, and the possibility of cross infection is eliminated.

Milk conduits 19 are preferably of flexible material, as plastic or rubber composition hoses, to accommodate movement of the cow during milking and to facilitate retraction of the milking apparatus from its position under the cow when the milking operation is completed. Straps 28 hold the hoses 19 in a bundle for ease in handling. Alternatively, a single extrusion with four flow passages may be used. Chambers 18, quarter shutoff valves 20, manifold 25 and pipeline 27 are preferably of stainless steel or of a rigid plastic. The connectors 24, 26 may also be of stainless steel or may be rubber or plastic tubing to facilitate assembly of the parts.

In a typical double action milking system, carry-away pipeline 27 is evacuated and through the various interconnections a continuous vacuum is maintained in the interior of the flexible inflations. The space between each teat cup shell and the inflation is alternately evacuated and vented to atmosphere so that the inflations open and close. Alternate vacuum and air from a pulsation control (not shown) is connected through hose 30, pulsation divider 31 and connector hoses 32 with the teat cup shells.

Chambers 18 each have a capacity sufficient to hold at least the quantity of milk given by a single quarter in one pulsation so that the milk separates from the inflation stem and is not drawn back around the teat when the inflation expands. A chamber with a volume of one-half pint has been found satisfactory.

Chambers 18 each have a domed top 34 with an inlet nipple 35 extending upwardly and outwardly therefrom to receive the stem 17 of the teat cup inflation. An outlet nipple 36 extends radially from the lower portion of each chamber for connection with milk conduits 19. Chambers 18 are generally cylindrical in configuration and are mounted in a carrier plate 37. A post 38 extends upwardly from the center of carrier plate 37 and the pulsation divider 31 is mounted thereon. A supporting arm 40, part of a supporting mechanism mounted on the stall structure (not shown) has a ball 41 at the end thereof. A pair of friction plates 42, 43 are clamped around ball 41 by bolts 44. The angular attitude of the carrier plate 37 may be adjusted so that the teat cups are properly positioned to accommodate the conformation of the cow's udder.

Figure 2:
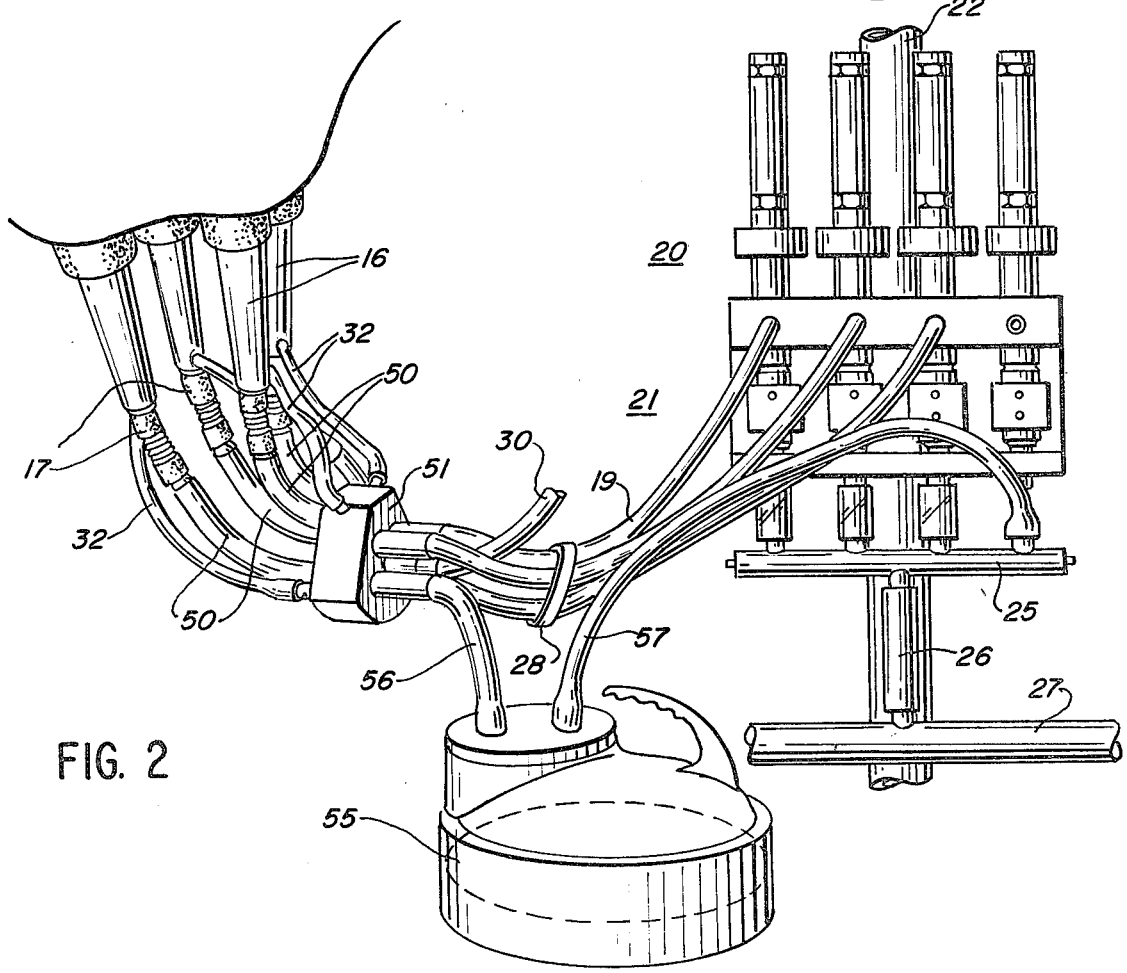
FIG. 2 is a diagrammatic illustration of another embodiment of the invention.
Figure 3:
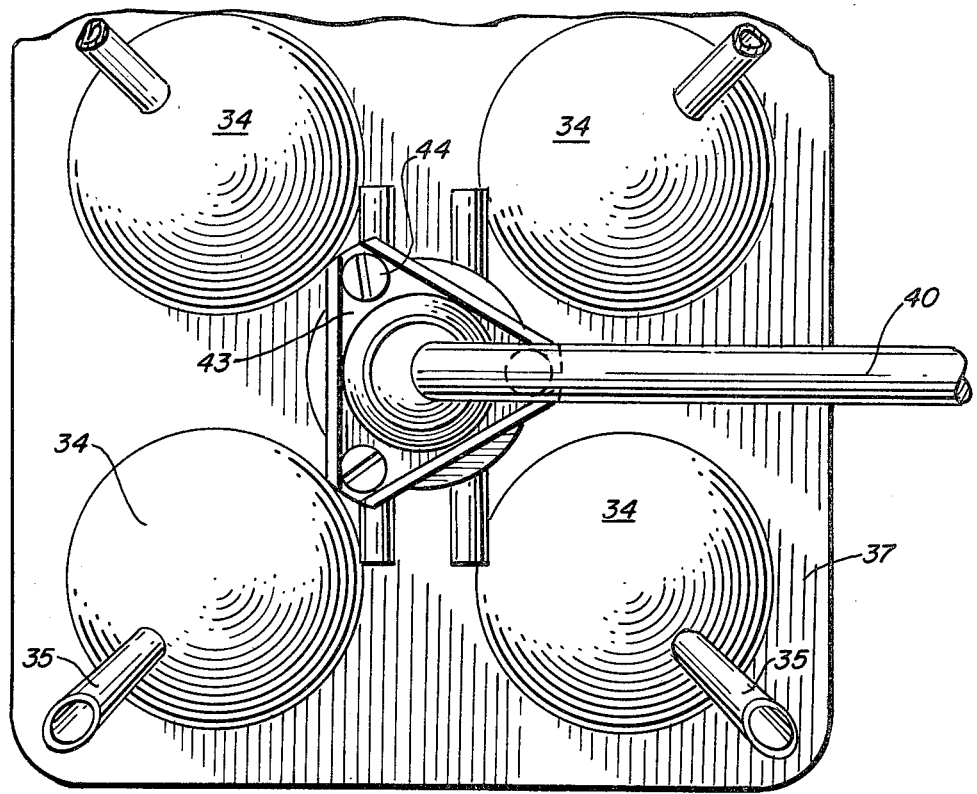
FIG. 3 is an enlarged plan view of a portion of the milking apparatus of FIG. 1.
Figure 4:
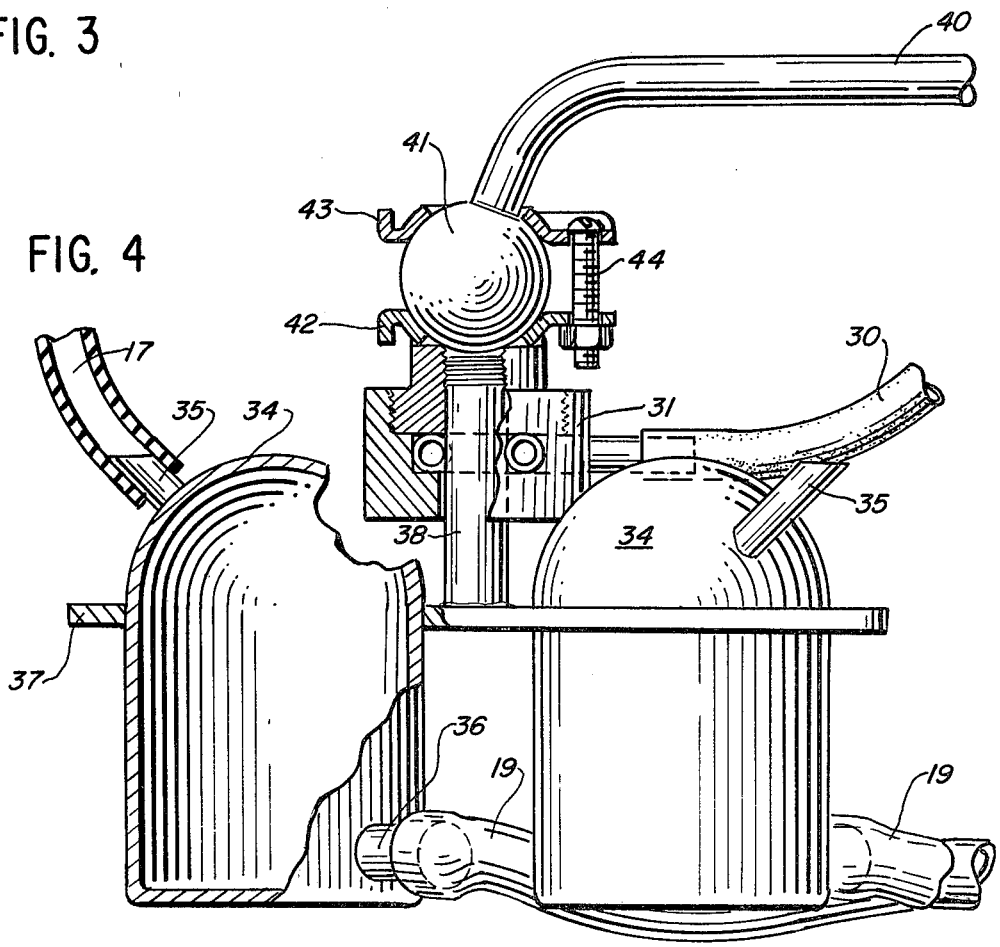
FIG. 4 is a broken elevation of the apparatus of FIG. 3.
Figure 5:
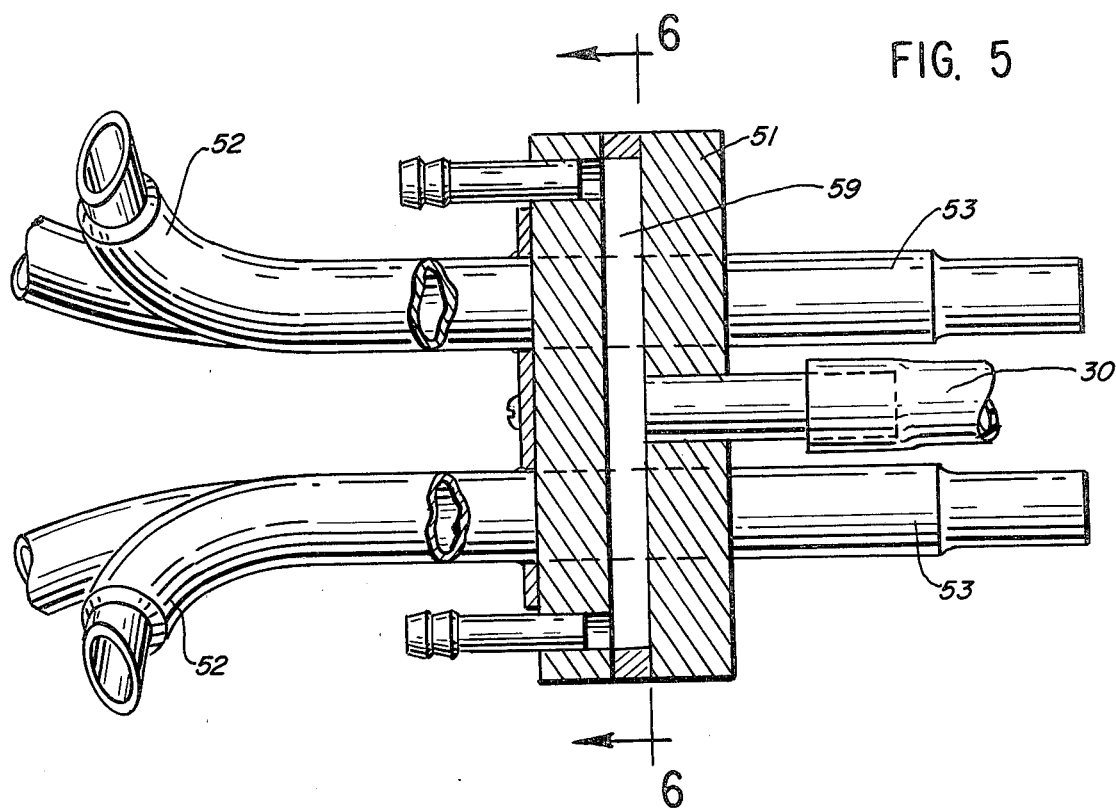
FIG. 5 is an enlarged transverse section of a portion of the milking apparatus of FIG. 2 taken along line 5—5 of FIG. 6.
Figure 6:
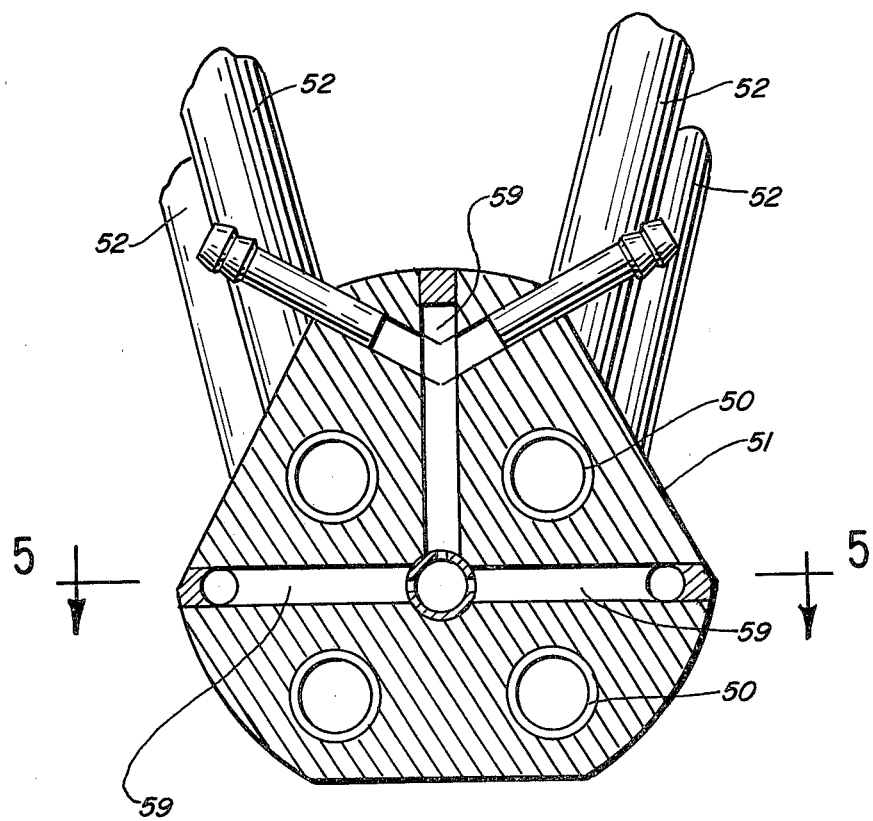
FIG. 6 is a section taken along line 6—6 of FIG. 5.
Figure 13:
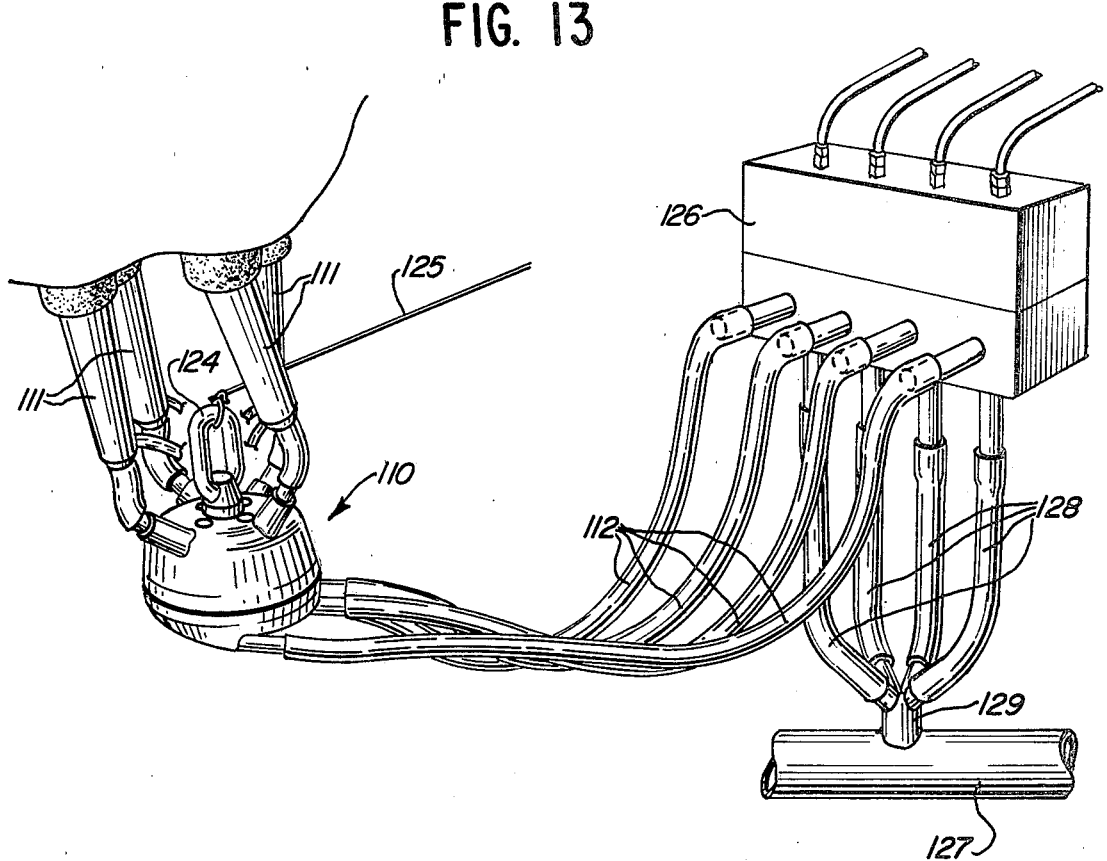
FIG. 13 is a diagrammatic illustration, similar to FIGS. 1 and 2, of another embodiment of the invention.
Figure 14:
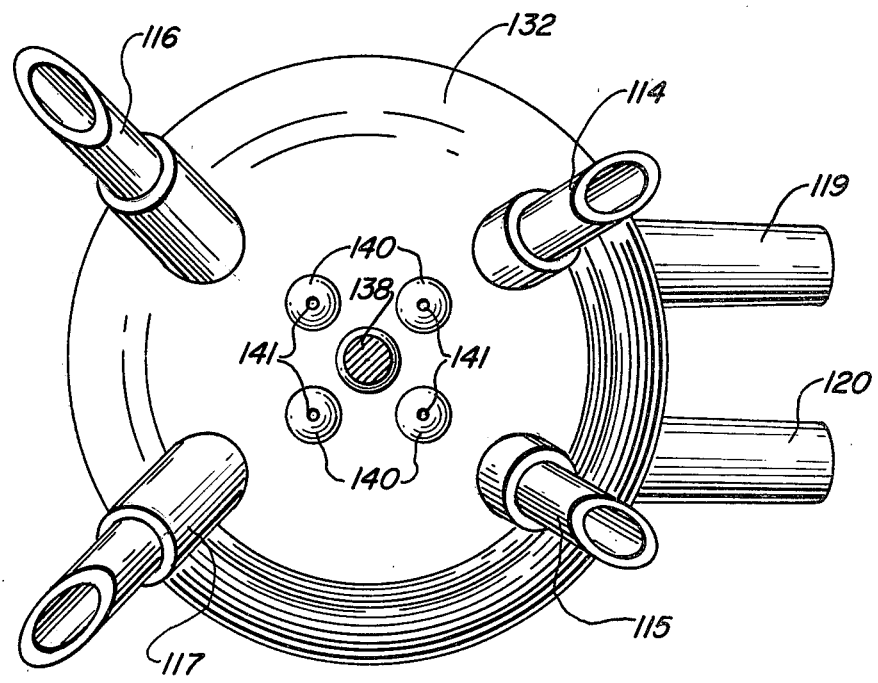
FIG. 14 is a plan view of the milk receiver of FIG. 13.

FIGS. 2, 5 and 6 illustrate an alternate embodiment of the independent quarter milker with components which are less expensive than those in the apparatus of FIGS. 1, 3 and 4. Elements which are common to the two figures will be identified with the same reference numerals and will not be described in detail. Tubular conduit connectors 50, which may for example be of stainless steel, are mounted in a carrier block 51 preferably of molded plastic. The tubular connectors extend through the carrier block generally at right angles to the plane of the block. Inlet ends 52 of the connectors are curved to extend generally parallel to the plane of carrier block 51 and diverge to receive the stems 17 of the teat cup inflations. Outlet ends 53 of the connectors extend from the other side of carrier block 51 and are generally parallel to receive the independent milk hoses 19. Connector block 51 has passages 59 through which the alternating air and vacuum from the pulsation control hose 30 are divided for connection with each of the teat cups.

Three of the milk hoses 19 are shown connected with the shutoff valve assembly 20 as in FIG. 1. An auxiliary milk collection vessel 55 has an inlet connected with the teat cup for one quarter through hose 56 and has a vacuum port connected through hose 57 with manifold 25. Merely by removing one hose 19 and connecting the auxiliary vessel 55 as shown, the milk from an infected quarter can be collected for disposal. The milk from the other quarters is not contaminated and is delivered through the pipeline 27 to the bulk tank. The auxiliary milk collection apparatus might also be used, for example, to measure individual quarter production.

A quarter flow sensor 21 and shutoff valve 20 are illustrated in FIG. 7. A tubular valve housing 63, preferably of stainless steel, has an inlet nipple 64 to which the individual quarter milk conduit 19 is connected. An inwardly extending rib 65, below nipple 64, provides the seat for shutoff valve 66.

Flow sensor electrodes 67 are mounted in a block 68 of insulating material secured to the valve housing by strap 69. Electrodes 67 extend into the housing and are contacted by the milk flowing therethrough. So long as milk flows, an electrical circuit is completed between the electrodes which are connected with a valve control circuit 70. The valve control circuit provides an operating signal to electrical valve actuator 71 causing the valve to close when milk flow ceases. Details of a suitable circuit may be found in Needham et al U.S. Pat. No. 3,773,016.

Valve 66 is mounted on a rod 73 which extends upwardly through a plastic fitting 74 into valve actuator 71. An armature 71a on the end of the rod is urged upwardly by a spring 75. When the valve actuator is not energized, the valve rod and valve are in their upper position, shown in broken lines. When milk flow ceases and the valve actuator is energized, armature 71a is drawn downwardly shutting valve 66 and closing off the vacuum applied to the teat cup. Air is admitted to the upper portion of the valve housing 63 through an inlet port 76 in plastic fitting 74, relieving the vacuum in the milk conduit 19 and in the interior of the teat cup inflation. This allows the teat cup to drop from the animal. Plastic fitting 74 has a tight fit with valve rod 73 above air inlet 76, sealing the valve from the actuator. Further, valve member 66 in its open position engages the bottom face of plastic fitting 74, restricting the air admitted through inlet 76.

The valve controls for each of the quarters are connected with a milker retraction control 78. When all of the valves are closed, the retraction control is actuated to withdraw the milker from beneath the cow. Suitable mechanisms for performing this function are known and it is not shown here.

FIGS. 8 and 9 illustrate other actuators for the shutoff valve. Elements which are common in FIGS. 7, 8 and 9 are identified with the same reference numerals and will not be described in detail. FIG. 8 shows a vacuum actuator. A piston 80 is secured to the end of the valve rod 73 and urged upwardly by spring 81. Cylinder 82 has an exhaust fitting 83 connected through a valve 84 with vacuum source 85. When milker valve control 70 determines that milk flow has ceased, valve 84 is opened and cylinder 82 is evacuated closing shutoff valve 66. In FIG. 9 a source of air pressure is connected through valve 84 with cylinder 82, driving piston 80 downwardly to close the shutoff valve 66.

FIGS. 10-12 illustrate a float valve assembly 85 which may be used in place of the shutoff valves and flow sensors 20, 21 of FIGS. 1 and 2. Four float valve units 86 are mounted on a plate 87 which is preferably secured to stall member 22. Each of the valve units has an inlet nipple 88 for connection with one of the milk conduits 19 and an outlet 89 for connection with manifold 25. Only one of the valve units will be described since they differ only in details as the orientation of the inlet nipples.

Inlet nipple 88 is mounted in the wall of chamber 91 so that incoming milk is directed tangentially and flows around the chamber wall. Outlet 89 has tubular portion 92 which extends upwardly into chamber 91. Annular float 93 surrounds outlet tube 92 and has a U-shaped bracket 94 secured to the upper surface. Valve member 95 is carried from the top of bracket 94. So long as milk is flowing, float 93 lifts valve 95 and the milk passes through the chamber into outlet tube 89. As milk flow diminishes, the float drops and valve 95 is seated in the end of tube 92. The last portion of the milk in the chamber is drained through a small passage 97 providing a time delay so that the valve does not close if the flow of milk diminishes temporarily. An O-ring 98 in the base of chamber 91 seals with the bottom surface of float 93 so that all vacuum is shut off when the valve is closed.

A mechanical lift rod extends from bracket 94 upwardly through the top wall of chamber 91 and has a knob 101 at its upper end. At the start of milking, the operator lifts plate 102 opening the shutoff valve 95 in each of the chambers 86. After milking has started, plate 102 is lowered so that the valve can close as flow ceases from each quarter.

A nipple 104 on each of the chambers 101 is connected with a pneumatically actuated retraction control (not shown). When each of the shutoff valves 95 is closed, vacuum is removed from the retraction control and operates to withdraw the milking apparatus from beneath the cow.

The quarter milker of FIGS. 13-17 has an intermediate milk receiver 110, of molded plastic, connected between the four teat cups 111 and the four milk conduits 112. A moldable, high temperature plastic, as polysulfone, is suitable. This construction is preferable to the stainless steel milk receiver of FIG. 1 where the volume of milkers manufactured warrants the investment in molding dies. The plastic receiver is lighter than stainless steel, less expensive to manufacture in quantity and can be transparent so that milk flow may be observed by the operator.

The intermediate milk receiver has four inlet nipples, 114, 115, 116, 117, extending from the top, to which are connected the milk tubes of the teat cups 111. Four outlet nipples 119, 120, 121 and 122 extend from the bottom of the receiver and have the milk conduits 112 connected thereto. A ring 124 extending upwardly from a central location on top of the milk receiver has the lanyard 125 of a retraction mechanism (not shown) connected thereto. The retraction mechanism, as is known, can be actuated at the end of the milking operation to withdraw the milker from under the cow.

Milk conduits 112 are connected with a remote valve assembly 126 which may be mounted at a suitable location, as on the stall structure, adjacent the milk pipeline 127. The valves are illustrated as air actuated and may incorporate milk flow sensing as illustrated in FIG. 7. Conduits 128 connect the valves with a multiple nipple 129 mounted on pipeline 127. The milk from the four quarters is not mixed until it reaches the pipeline. A mastitis detector may be interposed in conduits 128 to identify an infection in one of the quarters of the cow. Milk flow signals may be provided by the mastitis detector to actuate the individual valves of valve assembly 126 eliminating the need for other flow sensors.

Milk receiver 110 is divided along a generally horizontal plane into a top section 132 and a bottom section 133. As best seen in FIG. 16, diametrically extending interior walls 134 and 135 divide the interior of the receiver into four chambers. The walls shown are in bottom section 133. Similar walls are provided in top section 132. The joint between the sections is sealed by a gasket 137. The sections are held together by a bolt 138 which is threaded into a socket 139 at the base of ring 124.

For convenience of reference, the side of the milk receiver which faces the head of the cow will be designated the front and the side of the receiver which faces the tail of the cow will be designated the rear. Interior wall 134 extends along the longitudinal axis of the receiver from the front to the rear. Wall 135 extends at right angles thereto, generally transversely of the receiver. Top section 132 is dome shaped with the inlet nipples 114—117 extending upwardly and outwardly from each chamber so that the teat cups 111 are appropriately located for attachment to the cow's teats. Nipples 114 and 115 at the front of the receiver extend upwardly from the central dividing plane of the receiver at an angle of the order of 55° and outwardly from a plane parallel with the longitudinal axis of the receiver at an angle of the order of 30°. The nipples 116 and 117 have an angle of the order of 40° with a horizontal plane and of the order of 45° with a plane parallel with the longitudinal plane.

The lower wall of each chamber has a generally planar surface facing the front of the milker, and to which each outlet nipple is secured. For example, the lower portion of the intermediate wall 135 forms the planar surface for the two rear chambers of the milk receiver. The four outlet nipples extend forward, are generally parallel with each other and are inclined downwardly at an angle of the order of 20° from the low point of each chamber so that milk will readily drain therefrom.

The wall of the top section has, for each of the four chambers, an outward protrusion 140, FIG. 17. An air inlet opening 141 extends through the receiver wall at the protrusion. Both the outer and inner surfaces of the protrusion are smoothly curved and extend outwardly from the surrounding surface of the top section. The protrusion tends to inhibit the flow of a liquid film across the surface to the air inlet opening. Milk on the inner surface of the receiver could dry and block the opening while liquid on the outer surface of the receiver could be drawn in through the air inlet opening and contaminate the milk.

The independent quarter milking system enables individual quarter control with the flow sensors and shutoff valves removed from their usual location beneath the cow. This reduces the exposure of the flow sensors and shutoff valves to damage, simplifies system design and enhances reliability. The problem of cross infection of quarters is eliminated and milk from an infected quarter is isolated and may readily be collected.

We claim:

1. An independent quarter milker for use in the stall of a milking parlor, the stall confining a cow during milking, and having an evacuated milk pipeline adjacent thereto comprising:

four double action teat cups, one for connection with each of the cow's teats;

four milk conduit means including a flexible hose, one connected with each teat cup to direct the milk to said milk pipeline, the milk from each quarter being isolated from the milk from the other quarters;

means measuring the electrical current flow through the milk in each conduit means for sensing flow through each conduit;

an electrically actuated shutoff valve in each conduit means; and means responsive to said flow sensing means for closing each shutoff valve in the absence of milk flow through the associated conduit means, said shutoff valves, flow sensing means and valve closing means being mounted on the stall structure adjacent the cow.

2. An independent quarter milker for use in the stall of a milking parlor, the stall confining a cow during milking, and having an evacuated milk pipeline adjacent thereto, comprising;

four double action teat cups, one for connection with each of the cow's teats;

four milk conduit means each including a flexible hose, one connected with each teat cup to direct the milk to said milk pipeline, the milk from each quarter being isolated from the milk from the other quarters;

means measuring the electrical current flow through the milk in each conduit means for sensing flow through each conduit;

an air actuated shutoff valve in each conduit means; and means responsive to said flow sensing means for closing each shutoff valve in the absence of milk flow through the associated conduit means, said shutoff valves, flow sensing means and valve closing means being mounted on the stall structure adjacent the cow.

3. An independent quarter milker for use in the stall of a milking parlor, the stall confining a cow during milking, and having an evacuated milk pipeline adjacent thereto, comprising:

four double action teat cups, one for connnection with each of the cow's teats;

four milk conduit means each including a flexible hose, one connected with each teat cup to direct the milk to said milk pipeline, the milk from each quarter being isolated from the milk from the other quarters;

means measuring the electrical current flow through the milk in each conduit means for sensing flow through each conduit;

a vacuum actuated shutoff valve in each conduit means; and means responsive to said flow sensing means for closing each shutoff valve in the absence of milk flow through the associated conduit, said shutoff valves, flow sensing means and valve closing means being mounted on the stall structure adjacent the cow.

4. In a quarter milking system having four double action teat cups one for connection with each of a cow's teats and in which the milk from each quarter of the cow is delivered to a common point remote from the cow through independent milk conduit means, the improvement comprising:

an intermediate milk receiver with top and bottom walls, interposed between the teat cups and the conduit means, the receiver having four separate chambers;

an inlet nipple extending from the top wall of each chamber for connection with a teat cup; and an outlet nipple extending from the bottom wall of each chamber for connection with a milk conduit, said inlet nipples diverging outwardly and upwardly from the top wall of the milk receiver and said outlet nipples all extending in generally the same direction from the bottom wall of the milk receiver, the top wall of each of said chambers having an outward protrusion with smoothly curved outer and inner surfaces, and an air inlet opening extending through each top wall at said protrusion.

5. In a quarter milking system having four double action teat cups one for connection with each of a cow's teats and in which the milk from each quarter of the cow is delivered to a common point remote from the cow through independent milk conduit means, the improvement comprising:

an intermediate milk receiver with top and bottom walls, interposed between the teat cups and the conduit means, the receiver having four separate chambers;

four inlet nipples extending from the top wall of said receiver, for connecting a teat cup with each of said chambers, and with the receiver in milking position beneath the cow, two of the inlet nipples extending forwardly of the cow from the receiver and two extending rearwardly of the cow therefrom, the forwardly extending nipples having an angle with the horizontal plane of the milk receiver of the order of 55° and an angle with the longitudinal plane of the milk receiver of the order of 30° and the two rearwardly extending nipples having an angle with said horizontal plane of the order of 40° and an angle with said longitudinal plane of the order of 45°; and four outlet nipples extending from the bottom wall of the receiver for connecting milk conduits with each of said chambers, the outlet nipples being substantially parallel and extending forwardly of the cow from the milk receiver.

6. In a quarter milking system having four double action teat cups one for connection with each of a cow's teats and in which the milk from each quarter of the cow is delivered to a common point remote from the cow through independent milk conduit means, the improvement comprising:

an intermediate milk receiver with top and bottom walls, interposed between the teat cups and the conduits, the receiver having four separate chambers;

an inlet nipple extending from the top wall of each chamber for connection with a teat cup; and an outlet nipple extending from the bottom wall of each chamber for connection with a milk conduit, said inlet nipples diverging outwardly and upwardly from the top wall of the milk receiver and said outlet nipples all extending in generally the same direction from the bottom wall of the receiver, the bottom wall in each chamber having a surface which, with the receiver in milking position beneath the cow, faces generally in the direction forwardly of the cow and with said outlet nipples extending forwardly from said surfaces.

7. The milk receiver of claim 6 in which each of said outlet nipples is inclined downwardly from the low point of the associated chamber at an angle of the order of 20° to the horizontal plane of the milk receiver.

8. In a quarter milking system having four double action teat cups one for each of a cow's teats and in which the milk from each quarter of the cow is delivered to a common point remote from the cow through independent milk conduit means, the improvement comprising:

an intermediate milk receiver of transparent molded plastic with top and bottom sections defined by a generally horizontal plane through the receiver, each section having two generally diametric, orthogonal walls, the walls in each section mating with the sections assembled together, to divide the receiver into four chambers;

four inlet nipples extending upwardly from the top section for connecting each chamber with a teat cup; and four outlet nipples extending in generally the same direction from the bottom section for connecting each chamber with a milk conduit means through which milk is delivered to a point remote from the cow.

9. The intermediate milk receiver of claim 8 having with the receiver in milking position beneath the cow two inlet nipples extending forwardly from the receiver and two inlet nipples extending rearwardly therefrom, the forwardly extending nipples having an angle with the horizontal plane of the milk receiver of the order of 55° and an angle with the longitudinal plane of the milk receiver of the order of 30°, said two rearwardly extending inlet nipples having an angle with said horizontal plane of the order of 40° and an angle with said longitudinal plane of the order of 45°.

10. The intermediate milk receiver of claim 8 in which the bottom wall of each chamber has a surface which faces generally forwardly of the front of the and said outlet nipples extend forwardly from said surfaces.

11. The intermediate milk receiver of claim 10 in which each of said outlet nipples is inclined downwardly from the low point of the associated chamber at an angle of the order of 20° to the horizontal plane of the milk receiver.

* * * * *